Patented Feb. 10, 1948

2,435,853

UNITED STATES PATENT OFFICE 2,435,853

COMPOUNDING BUTADIENE-ACRYLONITRILE COPOLYMER WITH AN ALCOHOL ESTER OF A MONO-ALKENYL SUBSTITUTED SUCCINIC ACID

Leslie T. Sutherland, Yonkers, N. Y., assignor to Allied Chemical & Dye Corporation, New York, N. Y., a corporation of New York No Drawing. Application April 13, 1944, Serial No. 530,946

16 Claims. (Cl. 260—36)

This invention relates to compounding synthetic elastomers, and more particularly to production of vulcanizates of butadiene-acrylonitrile copolymer.

Heretofore, it has been proposed to employ as softening and plasticizing agents for butadiene-acrylonitrile copolymer, esters which possess appreciable volatility at elevated temperatures and are soluble in solvents such as hydrocarbon oils. Butadiene-acrylonitrile copolymer vulcanizates (products of vulcanization) compounded with these materials lose weight when subjected to relatively high temperature for prolonged periods of time owing to volatilization of the esters, and are subject to attack by hydrocarbon solvents due to solubility of the esters in the solvents.

It is an object of this invention to provide a process of compounding butadiene-acrylonitrile copolymer vulcanizates with a special class of esters which reduce the tendency of the vulcanizates to lose weight under the influence of heat and impart improved resistance to attack by hydrocarbon solvents.

It is another object of the invention to provide a process of compounding butadiene-acrylonitrile copolymer which results in vulcanizates of desirable tensile properties.

It is a further object of the invention to produce butadiene-acrylonitrile copolymer vulcanizates of high tensile strength and of improved resistance to deterioration under the influence of heat and solvents. Other objects and advantages will appear hereinafter.

In accordance with the invention, butadiene-acrylonitrile copolymer is compounded with sulfur and esters formed by esterifying alkenyl-substituted succinic acids or their anhydrides containing from 4 to 14 carbon atoms in the alkenyl group with alcohols in proportions of from 20 to 60, preferably 25 to 50, parts by weight of the esters for each 100 parts by weight of the copolymer. The preferred esters are those formed by esterifying the acids or their anhydrides with monohydroxy alcohols containing not more than 7 carbon atoms in the molecule, particularly esters in which the total number of carbon atoms in the ester molecule does not exceed 32.

At least 1, preferably at least 1.5, parts by weight of sulfur should be employed for each 100 parts by weight of the copolymer. For the production of resilient vulcanizates ordinarily not more than 5 parts of sulfur are utilized for each 100 parts of the copolymer. If it is desired to produce rigid vulcanizates of the hard rubber type, larger amounts of sulfur, e. g. up to 47 parts of sulfur for each 100 parts of the copolymer may be employed.

During vulcanization, a portion of the sulfur present in the mix reacts with the esters, probably at the double bond of the alkenyl group, and forms compounds of lower volatility and solubility in hydrocarbon oils than the esters themselves. While the exact nature of the reaction is not fully understood, some of the sulfur may react both with the alkenyl groups of the esters and with unsaturated groups of the copolymer, so that at least a portion of the ester is chemically linked by sulfur to the vulcanized copolymer. In view of reaction of a portion of the sulfur with the esters, it is ordinarily desirable to incorporate somewhat more sulfur in the copolymer in carrying out the invention than when esters that do not react with the sulfur are utilized; for example, at least .5 part by weight of sulfur in excess of the amount customarily employed in conjunction with other esters, per 100 parts by weight of the copolymer, may be employed with satisfactory results. In addition to rendering the copolymer vulcanizates more resistant to heat and oils, the esters also impart high tensile strength and other desirable tensile properties to the copolymer.

The alkenyl-substituted succinic acids or anhydrides utilized in making the esters may be prepared by reacting mono-olefins containing from 4 to 14 carbon atoms in the molecule, e. g. mono-olefinic cracked petroleum distillate fractions of appropriate boiling range, with maleic anhydride, at an elevated temperature sufficiently high to promote the reaction, preferably above 200° C., under sufficient pressure to maintain the mono-olefins in the liquid phase. The anhydrides obtained from this reaction may be represented by the following formula:

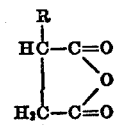

in which R is a straight or branched chain alkenyl radical containing a single double bond and from 4 to 14 carbon atoms, preferably from 6 to 12 carbon atoms. The resultant alkenyl succinic acid anhydrides are reacted with an appropriate alcohol until esterification of the anhydrides is substantially complete. Where monohydric alcohols are employed, the resultant diesters may be represented by the following formula:

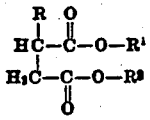

in which $R^1$ and $R^2$ are the same or different hydrocarbon radicals, for example, alkyl, cycloalkyl, or aralkyl radicals corresponding to the hydrocarbon radical of the hydroxy compound employed in effecting esterification, and R is an alkenyl group containing from 4 to 14 carbon atoms. Where diydroxy alcohols are utilized, the esters are of the chain type, as shown by the following formula for the ethylene glycol ester:

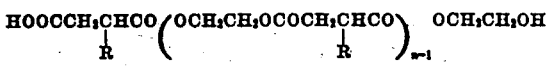

in which $n$ is the number of anhydride and glycol molecules which combine to form the ester molecule, and R is an alkenyl group containing from 4 to 14 carbon atoms. The anhydrides may be hydrated before esterification and the esters formed by reaction of the acids with the desired alcohols.

In preparing the monohydric alcohol esters, esterification may be carried out by reacting the anhydrides with the desired hydroxy compound at temperatures of from 95° to 195° C. until esterification is substantially complete. Completion of the esterification is indicated by cessation of evolution of water from the reaction mixture. Where polyhydroxy compounds, such as ethylene glycol, are employed, the reactants may be heated at a temperature below that at which the hydroxy compound is driven off, e. g. 150° to 190° C., until monoesterification is substantially complete and the temperature then raised above 190° C., e. g. from 195° to 300°., until esterification is substantially complete, i. e. evolution of water ceases. Further heating of the esters effects partial polymerization of the esters by reaction between the double bond of alkenyl groups of a plurality of ester molecules. The expression "esters" is used herein to include such partially polymerized as well as unpolymerized esters.

Esterification of anhydrides formed by reacting a mixture of mono-olefins such as cracked petroleum distillate with maleic anhydride, produces a mixture of ankenyl succinic acid esters, the average number of carbon atoms in the alkenyl groups of the esters depending on the boiling range of the distillate fraction employed. By utilizing fractions of narrow boiling range, ester mixtures whose alkenyl groups do not vary greatly in size from the average group of the mixture may be obtained. Substantially pure mono-olefins, such as amylene, hexene or nonene, may be employed, if desired, to form a substantially pure ester, but it is usually more economical to utilize cracked petroleum distillate containing a mixture of mono-olefins as the mono-olefinic hydrocarbons.

The compounds employed for esterifying the alkenyl-substituted succinic acids or their anhydrides include monohydroxy and polyhydroxy alcohols. Examples of such compounds are: methanol, ethanol, the propanols, butanols, allyl alcohol, cyclohexanol, methylcyclohexanols, benzyl alcohol, the methyl benzyl alcohols and dihydroxy compounds such as ethylene glycol, diethylene glycol and other polyethylene glycols. Preferably at least a sufficient amount of the hydroxy compounds is utilized to effect substantially complete esterification of the acids or anhydrides.

In addition to the ester and sulfur, the butadiene-acrylonitrile copolymer is preferably compounded with suitable amounts of vulcanizing accelerator, a metal oxide capable of activating the accelerator, and from .1 to 2 parts by weight of aliphatic fatty acid such as stearic acid per 100 parts by weight of the copolymer. Any accelerator capable of accelerating vulcanization of the copolymer either alone or in combination with an activating accelerator may be utilized. Examples of the accelerator types are: aldehyde-amines, such as formaldehyde-aniline reaction products and butyaldehyde-aniline reaction products; guanidines, such as diphenylguanidine and diphenylguanidine oxalate; thiazoles, such as 2-mercaptobenzothiazole, mixed dimethyl and ethyl thiazyldisulfides, benzothiazyl disulfide, and benzothiazyl-2-monocyclohexylsulfenamide; thiazolines, such as mercaptothiazoline; thiuram sulfides, such as tetramethylthiuram monosulfide and tetramethylthiuram disulfide; and dithiocarbamates, such as n-pentamethylene ammonium pentamethylenedithiocarbamate and zinc dimethyldithiocarbamate. From 3 to 5 parts by weight of a metallic oxide capable of activating the accelerator, preferably about 5 parts of zinc oxide, should be incorporated in each 100 parts of the copolymer. Fillers such as carbon black and non-black fillers and other conventional compounding ingredients may also be incorporated in the copolymer.

Dispersion of the esters, sulfur and other compounding ingredients in the butadiene-acrylonitrile copolymer may be accomplished in various ways utilizing conventional equipment of the type employed for compounding natural rubber, e. g. rubber mills of the roll type or internal mixers such as the Banbury mixer. It is desirable, particularly when employing accelerators having a tendency to scorch the copolymer, to incorporate the accelerator after the other compounding materials in order to prevent scorching during the compounding operation.

The following examples are further illustrative of the invention:

*Example 1*

| | Parts by weight |
|---|---|
| Butadiene-acrylonitrile copolymer | 100 |
| Ester | 30 |
| Channel black | 50 |
| Zinc oxide | 5 |
| Stearic acid | .5 |
| Sulfur | 2 |
| Benzothiazyl disulfide (accelerator) | 1.5 |

The softener was a mixture of dibenzyl esters of alkenyl succinic acid anhydrides containing an average of 9.6 carbon atoms in the alkenyl group. The copolymer was milled for about 10 minutes on a rubber mill at mill roll temperatures of between 100° and 120° C. and thereafter the channel black, sulfur, zinc oxide, stearic acid, ester softener and accelerator were added while continuing the milling. After the ingredients were thoroughly incorporated in the copolymer, the resultant mix was sheeted and stored overnight at room temperature and was then cured for 30 minutes at a temperature of 307° F. corresponding to a steam pressure (gauge) of 60 pounds per square inch.

The vulcanizate showed no appreciable change in volume after immersion in hexane at room temperature for 24 hours and no appreciable change in weight after heating for 4 days at 100° C. A vulcanizate which was similarly prepared, except that dibutyl phthalate was employed as the softener and 1.5 instead of 2 parts by weight of sulfur per 100 parts by weight of the copolymer were utilized, gained 1.5% by volume after immersion in hexane for 24 hours and lost 4.4% of its weight when subjected to 100° C. for 4 days.

Tensile and hardness tests on the vulcanizate before aging and after aging 4 days at 100° C. indicated that the softeners of the invention imparted tensile and hardness properties which compared favorably with those imparted by the dibutyl phthalate. The results of tensile and hardness tests are as follows:

|  | Properties of Vulcanizates of Example 1 | Properties of Vulcanizates containing dibutyl phthalate |
| --- | --- | --- |
| Tensile strength (pounds per square inch): |  |  |
| Unaged | 2,820 | 2,950 |
| Aged | 3,180 | 2,880 |
| Elongation (per cent at breaking point): |  |  |
| Unaged | 590 | 550 |
| Aged | 420 | 390 |
| Modulus (300%): |  |  |
| Unaged | 1,000 | 1,090 |
| Aged | 2,050 | 1,960 |
| Hardness (Shore A): |  |  |
| Unaged | 59 | 59 |
| Aged | 65 | 68 |

*Example 2*

Butadiene-acrylonitrile copolymer was compounded and cured in the same manner and with the same materials as described in Example 1 except that instead of the esters employed in Example 1, 30 parts by weight of a mixture of di-isopropyl esters of alkenyl succinic acid anhydrides containing an average of 7.4 carbon atoms in the alkenyl groups were employed. The vulcanizates lost weight slightly when heated but otherwise the properties of the vulcanizates were similar to those of Example 1.

*Example 3*

Butadiene-acrylonitrile copolymer was compounded in the same manner and with the same materials as described in Example 1, except that 2.5 parts by weight of sulfur were employed as the vulcanizing agent and 30 parts by weight of a mixture of dibenzyl esters of alkenyl succinic acids containing an average of 10 carbon atoms in the alkenyl groups were employed as plasticizers. The vulcanizates (cured 45 minutes at 307° F.) possessed somewhat higher tensile strength and elongation at the breaking point than the vulcanizates of Example 1 and otherwise possessed substantially the properties as the vulcanizates of Example 1.

Thus it will be seen the invention provides a process of compounding butadiene-acrylonitrile copolymer with esters of alkenyl-substituted succinic acids, which esters react with sulfur during vulcanization of the copolymer. The resultant vulcanizates possess desirable tensile properties and improved resistance to deterioration under the influence of hydrocarbon solvents and heat. Further, the alkenyl-substituted succinic acid esters utilized as plasticizers in accordance with the invention may be manufactured from readily available, relatively inexpensive materials.

The properties of the vulcanizates given herein were determined by the following methods: tensile strength, modulus and elongation by A. S. T. M. method D412–41 (¼" die); hardness by A. S. T. M. method D676–42T; and resistance to hexane by A. S. T. M. method D471–43T(B).

Since certain changes may be made without departing from the scope of the invention, it is intended that the above shall be interpreted as illustrative and not in a limiting sense.

I claim:

1. A process of making vulcanizates of vulcanizable butadiene-acrylonitrile copolymer which comprises compounding the copolymer with an alcohol ester of a monoalkenyl-substituted succinic acid containing from 4 to 14 carbon atoms in the alkenyl group and from 1 to 47 parts by weight of sulfur for each 100 parts by weight of the copolymer, and vulcanizing the resultant compound.

2. A process of making vulcanizates of vulcanizable butadiene-acrylonitrile copolymer which comprises compounding the copolymer with an alcohol ester of a monoalkenyl-substituted succinic acid containing from 4 to 14 carbon atoms in the alkenyl group, said ester being present in amount of from 20 to 60 parts by weight for each 100 parts by weight of the copolymer, and from 1 to 47 parts by weight of sulfur for each 100 parts by weight of the copolymer, and vulcanizing the resultant compound.

3. A process of making vulcanizates of vulcanizable butadiene-acrylonitrile copolymer which comprises compounding the copolymer with diesters of a monohydroxy compound and monoalkenyl-substituted succinic acid containing from 4 to 14 carbon atoms in the alkenyl group in amount equal to from 20 to 60 parts by weight to 100 parts by weight of the copolymer, the total number of carbon atoms in the ester molecule not exceeding 32, and sulfur in amount of from 1 to 5 parts by weight for each 100 parts by weight of the copolymer.

4. A process as claimed in claim 3 in which the monohydroxy compound is an alcohol containing not more than 7 carbon atoms and the alkenyl groups of the esters contain from 6 to 12 carbon atoms.

5. A process as defined in claim 3 in which the esters are dibenzyl esters of monoalkenyl-substituted succinic acids containing from 6 to 12 carbon atoms in the alkenyl groups.

6. A process of making vulcanizates of vulcanizable butadiene-acrylonitrile copolymer which comprises compounding the copolymer with diesters of a monohydroxy alcohol and monoalkenyl-substituted succinic acid containing from 6 to 12 carbon atoms in the alkenyl group in amount from 20 to 60 parts by weight for each 100 parts by weight of the copolymer and from 1 to 5 parts by weight of sulfur for each 100 parts by weight of the copolymer.

7. A process of compounding vulcanizable butadiene-acrylonitrile copolymer which comprises compounding the copolymer with alcohol diesters of a mixture of monoalkenyl-substituted succinic acids containing alkenyl groups having from 4 to 14 carbon atoms derived from cracked petroleum distillate, said diesters being present in amount of from 20 to 60 parts by weight for each 100 parts by weight of the copolymer, and from 1.5 to 5 parts by weight of sulfur for each 100 parts by weight of the copolymer, and vulcanizing the resultant compound.

8. A process as defined in claim 7 in which a vulcanizing accelerator, from 3 to 5 parts of zinc oxide and from 0.1 to 2 parts of stearic acid per 100 parts by weight of the copolymer are incorporated in the copolymer prior to vulcanization.

9. A vulcanizate prepared by vulcanizing vulcanizable butadiene-acrylonitrile copolymer having dispersed therein an alcohol ester of a monoalkenyl-substituted succinic acid containing from 4 to 14 carbon atoms in the alkenyl group and from 1 to 47 parts by weight of sulfur for each 100 parts by weight of the copolymer.

10. A vulcanizate prepared by vulcanizing a compound containing vulcanizable butadiene-acrylonitrile copolymer, an alcohol ester of a monoalkenyl-substituted succinic acid containing from 4 to 14 carbon atoms in the alkenyl group in amount of from 20 to 60 parts by weight of the ester for each 100 parts by weight of the copolymer, and sulfur in amount of from 1 to 5 parts by weight for each 100 parts by weight of the copolymer.

11. A vulcanizate prepared by vulcanizing a compound containing 100 parts by weight of vulcanizable butadiene-acrylonitrile copolymer, from 20 to 60 parts by weight of diesters of a monohydroxy compound and monoalkenyl-substituted succinic acid containing from 4 to 14 carbon atoms in the alkenyl group, the total number of carbon atoms in the ester molecule not exceeding 32, and from 1 to 5 parts by weight of sulfur.

12. A vulcanizate as defined in claim 11 in which the monohydroxy compound is an alcohol containing not more than 7 carbon atoms and the alkenyl groups of the esters contain from 6 to 12 carbon atoms.

13. A vulcanizate as defined in claim 11 in which the esters are dibenzyl esters of monoalkenyl-substituted succinic acids containing from 6 to 12 carbon atoms in the alkenyl groups.

14. A vulcanizate prepared by vulcanizing a compound containing 100 parts by weight of vulcanizable butadiene-acrylonitrile copolymer, from 20 to 60 parts by weight of diesters of a monohydroxy alcohol and monoalkenyl-substituted succinic acids containing from 6 to 12 carbon atoms in the alkenyl groups, and from 1 to 5 parts by weight of sulfur.

15. A vulcanizate prepared by vulcanizing a compound containing 100 parts by weight of vulcanizable butadiene-acrylonitrile copolymer, from 20 to 60 parts by weight of a mixture of alcohol diesters of monoalkenyl-substituted succinic acids containing alkenyl groups having from 4 to 14 carbon atoms derived from cracked petroleum distillate, and from 1.5 to 5 parts by weight of sulfur.

16. A vulcanizate as defined in claim 15 in which a vulcanizing accelerator, from 3 to 5 parts by weight of zinc oxide, and from .01 to 2 parts of stearic acid are incorporated in the copolymer prior to vulcanization.

LESLIE T. SUTHERLAND.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,297,290 | D'Alelio | Sept. 29, 1942 |
| 2,325,948 | Garvey | Aug. 3, 1943 |